United States Patent Office 3,303,156
Patented Feb. 7, 1967

3,303,156
PROCESS FOR THE STEREOSPECIFIC POLYMERIZATION OF BUTADIENE IN AN AQUEOUS EMULSION
Robert Dauby, Asnieres, and Philippe Teyssie, Colombes, France, assignors to Institut Francais du Petrole, des Carburants et Lubrifiants, Rueil-Malmaison, France
No Drawing. Filed Mar. 26, 1964, Ser. No. 356,005
21 Claims. (Cl. 260—29.7)

This invention relates to a process for the stereospecific emulsion polymerization of 1,3-butadiene to produce 1,4-trans-polybutadiene.

It is known that 1,4-trans-polybutadiene is a resinous product of great industrial value. For example, it can be molded under high pressure and temperature to produce a variety of products. It can also be vulcanized, either by itself or mixed with rubbers. It can also be used for the production of coatings which can be hardened by heat.

Heretofore, the conventional stereospecific methods of polymerization of butadiene have been either bulk or solution polymerization. It is known, moreover, that salts or rhodium, e.g. rhodium chloride, rhodium nitrate, ammonium chlororhodate and sodium chlororhodate make it possible to selectively convert butadiene into 1,4-trans-polybutadiene in an aqueous emulsion, which thereby constitutes an exception to the general rule. It appears, however, that since emulsion polymerization of butadiene under these conditions is relatively slow, there has been a lack of interest in the use of emulsion polymerization on an industrial scale. On the other hand, if the rate of emulsion polymerization were substantially higher, there would be an enthusiastic acceptance of this type of process because of the known general advantages of emulsion polymerization as compared to either bulk or solution polymerization.

A principal object of this invention, therefore, is to provide a novel process for the stereospecific emulsion polymerization which results in a relatively fast rate of polymerization.

Another object is to provide as novel compositions of matter, more particularly, pre-polymerization reaction mass, and the final products.

Upon further study of the specification and claims other objects and advantages of the present invention will become apparent.

These objects are attained by the surprising observation that by adding small amounts of 1,3-cyclohexadiene to the polymerizing mixture the speed of the stereospecific polymerization of 1,3-butadiene is multiplied many times, possibly up to or beyond 20 times, without in any manner deleteriously affecting the properties of the 1,4-trans-polybutadiene.

With this process the purity, the molecular weight and the crystallinity of the product remain unchanged or are even improved. Infra-red spectometry has shown the products thus obtained contain only negligible amounts of the 1,2- and 1,4-cis-isomers. All the experiments have further proved that the 1,3-cyclohexadiene does not produce a copolymer with the butadiene.

The results are thus surprising not only because cyclohexadiene has not been known to favor the polymerization of butadiene, but also because copolymerization of cyclohexadiene with butadiene does not occur. These results are even more unexpected since they appear to be specific to the pair: cyclohexadiene and butadiene. For example, it has been found that on the one hand other dienes, e.g. 1,3-cyclooctadiene end isoprene, exhibit a deleterious effect on the polymerization of butadiene, and on the other hand, 1,3-cyclohexadiene is without any significant effect on the polymerization of other 1,3-dienes, e.g. isoprene.

In view of the increase of speed of polymerization it is possible to conduct the polymerization at lower temperatures than was possible with earlier methods, which makes it possible to obtain purer products and also to recover the rhodium salt more easily at the end of the process. It has in fact been found that whereas the polymer produced above 50° C. is generally yellow, that produced below 50° C. has little, if any, color. Moreover, as will be seen from the examples, the invention makes it possible to obtain at 25° C. a speed of polymerization which could not be obtained heretofore except at temperatures on the order of 50 to 60° C.

With respect to quantity of added 1,3-cyclohexadiene, it has been found that an appreciable effect was obtained with only very small amounts. In practice it is advantageous to use the cyclohexadiene in amounts of about at leas three moles per mole of rhodium salt, and preferably at least 5 moles of cyclohexadiene per atom of rhodium of the slat. Proportions above 75 moles, particularly above 150 moles, of cyclohexadiene per mole of rhodium salt are less favorable because besides being more costly, they seem less advantageous than the preferred proportions of 10 to 40 moles of cycloheaxadiene per mole of rhodium salt.

The salts of rhodium can be used in very small amounts, e.g. on the order of 0.05 to 0.1 part or less per 100 parts by weight of butadiene. It is not advantageous to use more than 25 parts of rhodium salt per 100 parts of butadiene, the preferred proportions being on the order of 0.2 to 5 parts per 100 parts of butadiene. In general, however, it is sufficient to employ a catalytic quantity of a rhodium salt. Among the salts of rhodium the chloride $RhCl_3$ is preferred. Other rhodium salts include: rhodium sulfate, rhodium bromide, rhodium nitrate, ammonium chlororhodate, sodium chlororhodate, rhodium acetate and rhodium oxalate. Any other rhodium salt could be used, provided it is more than 0.05 percent by weight soluble in water, preferably more than 1%.

The present method can be performed over a large temperature range of for example from −30° C. to +100° C. The preferred range which is of greatest industrial interest is from 25 to 60° C.

The emulsifying agent can be of any known kind, although preferably of the anionic type. It is possible for example to use aryl sulfonates or alkyl-aryl sulfonates, e.g. sodium dodecyl-benzene-sulfonate, a sulfonated alcohol, etc. These agents are so well known that a complete list of them would be superfluous, it being noted that the invention is not based on the particular emulsifying agent. Moreover, it is used in the proportions generally employed for conventional polymerizations in ordinary emulsion, e.g. an emulsifying quantity on the order of 0.5 to 25 parts per 100 parts by weight of butadiene.

It is also possible, if desired, to add to the reaction mixture one or several additives, initiators, activators, regulators or supplementary catalysts of known types, although it is generally preferable to treat butadiene in the presence of only cyclohexadiene, water, an emulsifier and a rhodium salt.

With respect to the amount of water that is used, in general, the ratio in parts by weight is about 10–99 water phase to 90–1 organic phase.

It is also possible to apply the process of this invention not only to completely isolated and purified 1,3-butadiene, but also to a mixture of the latter with other hydrocarbons such as saturated hydrocarbons and mono-olefins. In such a case there is selectively obtained 1,4-trans-polybutadiene, namely the same product as from pure 1,3- butadiene, and with neither polymerization of the monoolefins that are eventually present in the reaction mixture, nor copolymerization of such mono-olefins with the butadiene, nor with any unfavorable effect on the specificity of the formation of 1,4-junctions of the trans-product.

This feature of the present invention is interesting because it permits the production of 1,4-trans-polybutadiene from crude butadiene, such as is obtained for example by dehydrogenation of $C_4$ hydrocarbons—this dehydrogenation gives on the average a mixture of 30% butadiene and 70% other $C_4$ hydrocarbons—butenes or butanes not having reacted.

The process of the present invention therefore eliminates the necessity of submitting the crude butadiene to expensive separation and purification processes prior to polymerization.

Another advantage of this process is that it can be conducted in the presence of air which again is an exception to the rule since polymerization processes are generally very sensitive to the presence of air, even when emulsions are used. Also, since the process is performed with an aqueous emulsion, the presence of moisture in the gases can be tolerated without difficulty.

The product is shown by infra-red spectrographic analysis to be 1,4-trans-polybutadiene. Its degree of crystallinity as shown by X-ray diffraction is very high (up to 53% when leaving the reactor).

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Parts are by weight, unless otherwise stated.

EXAMPLES 1 TO 10

Into reactor No. 1 are introduced 10 parts of an aqueous solution of 2.5% by weight of the sodium salt of dodecyl-benzene-sulfonic acid with 0.05 part of rhodium trichloride trihydrate and 5 parts of liquid 1,3-butadiene.

The same is done in reactors Nos. 2 to 10.

Into reactors 6 to 10 there is also introduced 0.243 part of 1,3-cyclohexadiene.

The reactors are then closed.

Reactors 1 to 5 therefore contain a conventional polymerization mixture while reactors 6 to 10 correspond to this invention where the molar ratio of cyclohexadiene to rhodium chloride is 16.

The reactors are then agitated for predetermined periods at 55° C. Each reactor is then rapidly cooled down to −15° C. Its contents are then emptied into isopropanol, the polymer precipitating as a powder. It is filtered and washed several times, first with water and then with isopropanol. It is then dried under reduced pressure at room temperature and the product weighed.

The results are given in Table I.

*Table I*

| Reaction Time | Without cyclohexadiene (Nos. 1 to 5) parts by weight of polymer | With cyclohexadiene (Nos. 6 to 10) parts by weight of polymer | Percent conversion to polymer |
| --- | --- | --- | --- |
| 40 min | 0.08 | 1.079 | 21.5 |
| 1 h., 50 min | 0.20 | 4.10 | 82 |
| 2 h., 30 min | 0.29 | 4.32 | 86.4 |
| 7 h | 0.86 | 4.30 | 86.2 |
| 16 h | 1.9 | 4.28 | 85.8 |

These examples show that in the presence of cyclohexadiene the reaction is practically completed in about 1 hour 50 minutes, while in the absence of cyclohexadiene during the same period the yield is 20 times less. After 16 hours in the absence of cyclohexadiene, the yield was not even half of what was obtained after 1 hour 50 minutes with cyclohexadiene.

EXAMPLES 11 TO 19

These examples show the effect of the molar ratio of cyclohexadiene to rhodium chloride.

The reaction mixture is composed of 10 parts of an aqueous solution of 2.5% by weight of dodecyl-benzene-sulfonate of sodium, 0.05 part of rhodium-trichloride-trihydrate, 5 parts of 1,3-butadiene and varying amounts of 1,3-cyclohexadiene.

The reaction continued for 1 hour 50 minutes.

The results are recorded in Table II. The percentages of crystallinity have been determined by X-ray diffraction.

*Table II*

| Example | Cyclohexadiene (parts by weight) | Molar ratio Cyclohexadiene/$RhCl_3$ | Parts by weight of polymer | Percent Crystallinity |
| --- | --- | --- | --- | --- |
| No. 11 | 0 | 0 | 0.2 | 33 |
| No. 12 | 0.031 | 2 | 0.87 | 36 |
| No. 13 | 0.061 | 4 | 1.45 | |
| No. 14 | 0.122 | 8 | 2.65 | 38 |
| No. 15 | 0.183 | 12 | 3.54 | |
| No. 16 | 0.243 | 16 | 4.10 | 40 |
| No. 17 | 0.486 | 32 | 3.79 | |
| No. 18 | 0.683 | 45 | 3 | 32 |
| No. 19 | 1.52 | 100 | 2.6 | 23 |

These examples show that within certain limits the speed (rate) of reaction and the crystallinity are proportional to the molar ratio of cyclohexadiene to rhodium chloride, but that it is not advantageous to have the ratio greater than that of the order of 12 to 32.

EXAMPLES 20 TO 22

These examples show the effect of temperature on the reaction.

The reaction mixture is composed in each case of 10 parts of an aqueous solution containing 2.5% by weight of dodecyl-benzene-sulfonate of sodium, 0.05 part of rhodium trichloride trihydrate, 5 parts of 1,3-butadiene and 0.243 part of 1,3-cyclohexadiene. The molar ratio of 1,3-cyclohexadiene to rhodium chloride is therefore 16.

The results obtained are recorded in Table III.

*Table III*

| Example | Temperature, ° C. | Reaction time | Weight of the polymer |
| --- | --- | --- | --- |
| No. 20 | 45 | 3 hours | 2.20 |
| No. 21 | 25 | 16 hours | 1.22 |
| No. 22 | 25 | 23 hours | 2.61 |

It is found therefore that the speeds of reaction at 25° C. in the presence of cyclohexadiene differ only slightly from those at 55° C. in the absence of cyclohexadiene (Examples 1 to 5).

The polymer however is perfectly white while it is slightly yellow (a trace of oxidation) if obtained at 55° C.

EXAMPLES 23 TO 24

In these examples the nitrate of rhodium is used instead of the chloride.

Into two reactors 23 and 24 made of stainless steel, the same reactants that were used in reactors 6 to 10, were introduced in the presence of air, except that the 0.05 part of rhodium chloride trihydrate were substituted by 0.05 part of rhodium nitrate dihydrate.

One of these two reactors was agitated 1 hour 30 minutes at 55° C. while the other was agitated 3 hours, with the following results obtained.

Table IV

| Example | Reaction time | Percent Conversion into Polymer |
|---|---|---|
| No. 23 | 1 h. 30 min | 14 |
| No. 24 | 3 hours | 25 |

EXAMPLES 25 TO 26

These examples relate to the use of butadiene diluted with butane.

Into two stainless steel reactors 25 and 26 there is introduced in the presence of air:

10 cc. of an aqueous solution containing 2.5% by weight of sodium dodecylbenzene-sulfonate
0.05 g. $RhCl_3 \cdot 3H_2O$
5 cc. butadiene
5 cc. butane
0.3 cc. cyclohexadiene One of the two reactors was agitated 1 hour 30 minutes at 55° C., and the other for 3 hours.
The results were as follows:

Table V

| Example | Reaction Time | Percent Conversion into polymer | Percent Crystallinity of polymer |
|---|---|---|---|
| No. 25 | 1 h., 30 min | 16 | 52.5 |
| No. 26 | 3 hours | 39 | 52.2 |

EXAMPLES 27 TO 28

These examples show the remarkable effect of an addition of cyclohexadiene on the speed of polymerization of butadiene in aqueous emulsion in the presence of rhodium chloride.

Into reactor 27 of stainless steel the same reactants were introduced as in reactors 25 and 26, and in the same proportions while in reactor 28 the cyclohexadiene was omitted.

The two reactors were agitated one hour at 55° C., and the following results were obtained.

Table VI

Example:         Percent conversion into polymer
No. 27 _____ 10
No. 28 _____ 1.4

EXAMPLES 29 TO 30

These examples relate to the use of butadiene, diluted with butenes.

Into two reactors 29 and 30 of stainless steel the same reactants as in Examples 25 and 26 were introduced in the presence of air, and in the same amounts as in those examples, but the 5 cc. butane were replaced by 5 cc. of an olefinic mixture composed of 2.5 cc. butene-1 and 2.5 cc. butene-2.

One of the reactors was agitated 1 hour 30 minutes at 55°, and the other reactor 3 hours.
The following results were obtained.

Table VII

| Example | Reaction Time | Percent conversion into polymer | Polymer obtained[1] |
|---|---|---|---|
| No. 29 | 1 h., 30 min | 18.2 | Crystallinity, 55.4%. |
| No. 30 | 3 hours | 49 | Crystallinity, 53.1%. |

[1] Specific viscosity, 0.19.

A comparison of this table with Table V shows that the butenes act merely as diluents, just as does butane in the preceding examples.

EXAMPLES 31 TO 32

These examples relate to the use of a mixture containing butadiene, such as found in unfractionated industrial mixtures.

Into two reactors 31 and 32 of stainless steel there is introduced, in the presence of air—

10 cc. of an aqueous solution containing 2.5% by weight of sodium dodecylbenzene-sulfonate
0.05 g. $RhCl_3 \cdot 3H_2O$
2 cc. butadiene
4.5 cc. butane
2.5 cc. butene-1
1 cc. butene-2
0.3 cc. cyclohexadiene The reactors are agitated at 55° C., one of them two hours and the other one 7 hours 30 minutes, with the following results.

Table VIII

| Example | Reaction Time | Percent conversion into polymer | Polymer obtained[1] |
|---|---|---|---|
| No. 31 | 2 hours | 20 | |
| No. 32 | 7 h., 30 min | 68 | Degree of crystallinity, 52%. |

[1] Intrinsic viscosity, 0.125.

The mixture containing the butadiene, used as the starting material in this experiment, corresponds essentially to the mixture formed during the production of butadiene by dehydrogenation of the $C_4$ hydrocarbons (by the Houdry process, for example).

All the polymers obtained in Examples 25 to 32 are constituted essentially of 1,4-trans-polybutadiene (from 98 to 100% according to infrared spectroscopy).

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the polymerization of 1,3-butadiene to 1,4-trans-polybutadiene in the presence of a stereospecific catalyst, the improvement which comprises adding a small quantity of 1,3-cyclohexadiene to the reaction mixture.

2. In a process for the stereospecific emulsion polymerization of 1,3-butadiene to 1,4-trans-polybutadiene in the presence of a stereospecific catalyst, the improvement which comprises adding a small quantity of 1,3-cyclohexadiene to the reaction mixture.

3. In a process for the stereospecific emulsion polymerization of 1,3-butadiene to 1,4-trans-polybutadiene in the presence of a catalytic quantity of rhodium salt, the improvement which comprises adding a small quantity of 1,3-cyclohexadiene to the reaction mixture, said quantity being effective to increase the rate of polymerization over that which is observed without the 1,3-cyclohexadiene.

4. In a process for the stereospecific emulsion polymerization of 1,3-butadiene to 1,4-trans-polybutadiene in the presence of a catalytic quantity of a rhodium salt, the improvement which comprises adding 1,3-cyclohexadiene to the reaction mixture in a quantity equal to at least 3 moles per mole of the rhodium salt.

5. The process of claim 4, wherein the rhodium salt is selected from the group consisting of rhodium nitrate, ammonium chlororhodate, sodium chlororhodate, and rhodium chloride, rhodium bromide, rhodium acetate, rhodium oxalate, and rhodium sulfate.

6. The process of claim 4, wherein the rhodium salt is rhodium chloride.

7. The process of claim 4, wherein the polymerization is conducted at a temperature between −30° C. and +100° C.

8. The process of claim 4, wherein the polymerization is conducted at a temperature between +25° C. and +60° C.

9. The process of claim 4, wherein the polymerization is conducted at a temperature below 50° C.

10. The process of claim 4, wherein the quantity of rhodium salt is 0.05 to 25 parts per 100 parts by weight of 1,3-butadiene.

11. The process of claim 4, wherein the quantity of rhodium salt is 0.2 to 5 parts per 100 parts by weight of 1,3-butadiene.

12. The process of claim 4, wherein the reaction mixture comprises a sodium sulfonate as the emulsifying agent.

13. The process of claim 4, wherein the reaction mixture comprises a diluent selected from the group consisting of saturated hydrocarbons, mono-olefinic hydrocarbons, and mixtures thereof.

14. The process of claim 4, wherein the reaction mixture comprises a hydrocarbon diluent selected from the group consisting of a butane, a butene, and mixtures thereof.

15. A composition of matter comprising an aqueous emulsion of 1,3-butadiene, a stereospecific catalyst and a small quantity of 1,3-cyclohexadiene.

16. The composition of claim 15, wherein the stereospecific catalyst is a rhodium salt.

17. The composition of claim 16, wherein said rhodium salt is selected from the group consisting of rhodium chloride, rhodium nitrate, ammonium chlororhodate, sodium chlororhodate, rhodium bromide, rhodium acetate, rhodium oxalate and rhodium sulfate.

18. In a process for the stereospecific emulsion polymerization of 1,3-butadiene to 1,4-trans-polybutadiene in the presence of a catalytic amount of a rhodium salt, the improvement which comprises adding 1,3-cyclohexadiene to the reaction mixture in a quantity equal to at least 5 moles per atom of rhodium in the rhodium salt.

19. The process of claim 4, wherein the rhodium salt is more than 0.05% by weight soluble in water.

20. In a process for the polymerization of 1,3-butadiene to 1,4-trans-polybutadiene in the presence of a stereospecific catalyst at temperatures ranging from −30° C. to +100° C., the improvement which comprises effecting the said polymerization in the presence of at least three moles of 1,3-cyclohexadiene per mole of stereospecific catalyst, whereby the speed of said polymerization is multiplied many times over that when said 1,3-cyclohexadiene is absent, and the polymerization product obtained contains only negligible amounts of the 1,2- and 1,4-cis polymers and no copolymers of butadiene and 1,3-cyclohexadiene.

21. The composition of claim 16, wherein the mole ratio of 1,3-cyclohexadiene to the rhodium salt is at least 3.

References Cited by the Examiner

UNITED STATES PATENTS 2,976,272   3/1961   Coover et al. _____ 260—94.3

FOREIGN PATENTS 916,092   1/1963   Great Britain.

MURRAY TILLMAN, *Primary Examiner.*

J. ZIEGLER, J. GOOLKASIAN, *Assistant Examiners.*